July 2, 1968 C. W. DAHLKE ET AL 3,390,850
FIN FOR INDUCING SPIN IN ROTATING ROCKETS
Filed Aug. 4, 1967
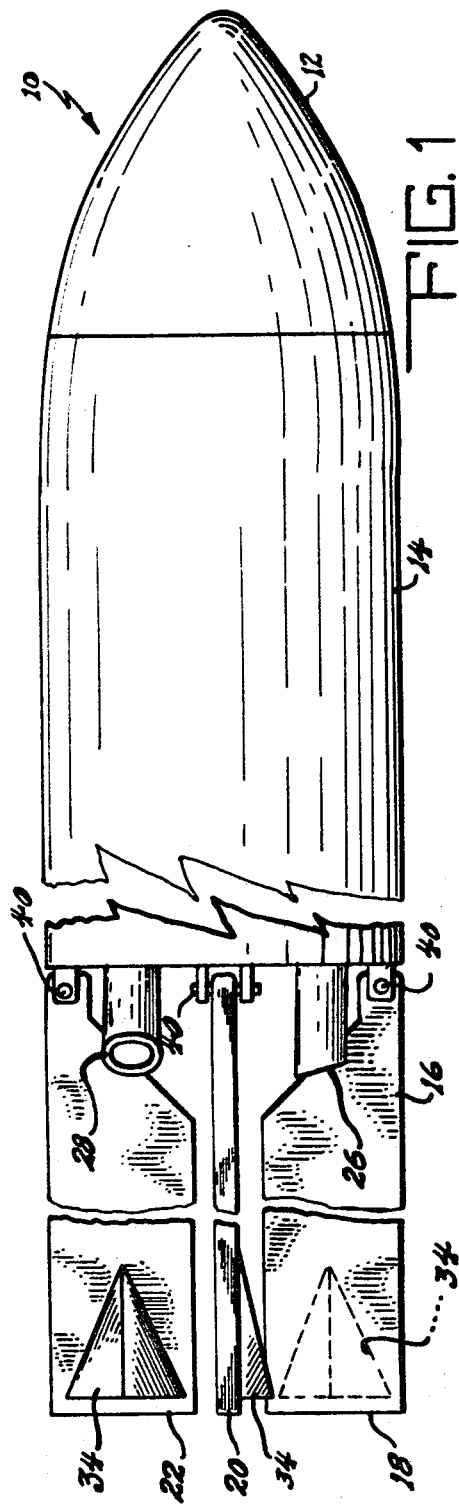
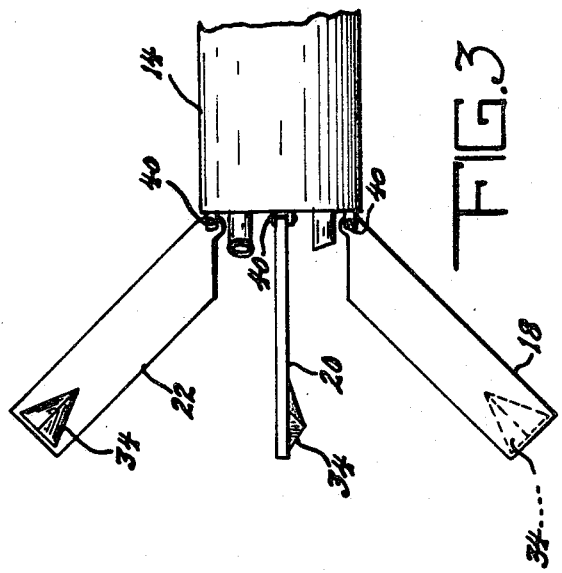
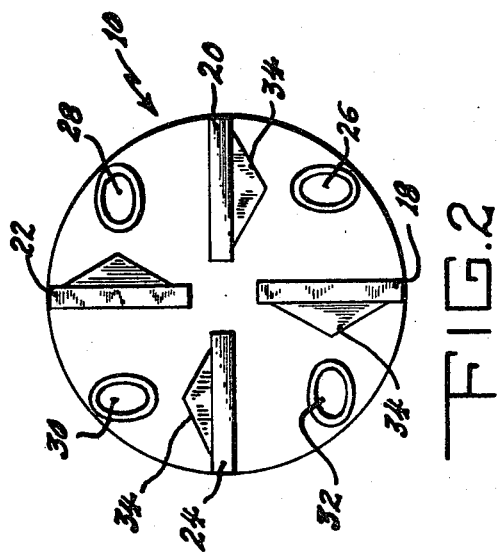
INVENTORS
CALVIN W. DAHLKE,
WILEY PETTIS
BY *Harry A. Herbert Jr.*
ATTORNEY
*Henry S. Miller Jr.*
AGENT 3,390,850
FIN FOR INDUCING SPIN IN ROTATING ROCKETS
Calvin W. Dahlke, Madison, and Wiley Pettis, Huntsville, Ala., assignors to the United States of America as represented by the Secretary of the Army
Filed Aug. 4, 1967, Ser. No. 658,993
3 Claims. (Cl. 244—3.23)

ABSTRACT OF THE DISCLOSURE

A half pyramid-wedge mounted on fins that fold aft on tube launched rockets. Booster nozzles exhaust a high velocity jet that impinges on the fins causing the rocket to spin while still in the launching tube thereby improving accuracy. The effect is enhanced by canted or scarfed nozzles.

---

This invention relates generally to folded fin aircraft rockets and more specifically to a means for improving the missile roll rate of the rocket in the launching tube and immediately after launching.

The most critical period of flight for a ballistic rocket or missile with regard to stabilization and accuracy is the time immediately after the rocket is ignited until it reaches its designed roll rate. During this period the rocket may travel several hundred feet from the point of ignition. The accuracy of the missile or rocket depends greatly upon the roll characteristic. A rocket which has no roll or is rolling very slowly is highly susceptible to crosswinds or turbulence which will greatly affect the dispersion pattern of rockets fired in series or salvo.

This problem has become particularly serious with regard to rockets fired from helicopters. The helicopter has a very substantial flow field from the rotary wing which is constantly varying depending upon the attitude of the aircraft. With rockets presently known the flow field combined with crosswinds and turbulence made it impossible to accurately predict where a helicopter launched rocket will strike. By imparting an adequate roll rate to the rocket before it leaves the launching tube it is possible to overcome these detrminetal effects and provide a rocket with predictable characteristics.

It is therefore an object of this invention to provide a new and improved means and method for increasing the accuracy of rockets.

It is another object of this invention to provide a new and improved means for increasing the roll rate of ballistic missiles and rockets.

It is a further object of this invention to provide a new and improved means for causing a rocket to spin while still in its launch tube.

It is still another object of this invention to provide a new and improved ballistic rocket which is more accurate than any heretofore known.

It is still a further object of this invention to provide a ballistic rocket system which is relatively unaffected by crosswinds, turbulence or helicopter down draft.

These and other advantages, features or objects of the invention will become more apprent from the following description taken in connection with the illustrative embodiment in the accompanying drawing wherein:

FIGURE 1 is a side elevational view or a rocket with the fins in the folded position;

FIGURE 2 is an end view of the rocket with the fins in the folded position; and

FIGURE 3 is a side elevational view of the aft section of a rocket with the fins extended.

Referring now to FIGURES 1 and 2 of the drawing, there is shown generally a missile 10. The missile is of the folded fin aircraft type which generally is launched from tubes located on the sides or under the wings of helicopters and fixed wing aircraft. These rockets are primarily designed for use against ground targets.

The rocket is divided into three sections, the warhead 12, the motor 14, and the fin stabilization section 16. The fin stabilization section is the object of this invention and it is comprised of four movable fins 18, 20, 22 and 24, and four booster exhaust nozzles 26, 28, 30 and 32.

Each fin has mounted thereon a reaction surface 34. The reaction surface is a half pyramid-wedge with the apex directed generally toward the forward end of the rocket. The wedge is mounted on only one side of the fin and taken together the wedges are mounted alternately on the fins around the base of the rocket. The booster nozzles exhaust a high velocity jet and force high pressure exhaust gases along and parallel to the fins. The raised wedge reacts with the exhaust gas and causes a roll moment while still in the launch tube. This effect is further enhanced by utilizing canted or scrafed nozzles. Without the reaction surface, interference of the canted jet with the folded fin in the tube effectively cancels any roll moment inside the tube. The wedge reacting surface need not be parallel with the longitudinal axis of the rocket. It has been found that by varying the angle between the wedge and the longitudinal axes of the rocket the roll rate of the rocket may be varied.

Concerning FIGURE 3 the aft section of the rocket motor is shown at 14. The fins (18, 20, 22 and 24) are opened in the manner of flight after the rocket exits the launch tube. The fins are hinged at 40 and connected by linkage means (not shown) to a piston located within the rocket motor section where the piston is activated by the rocket chamber pressure. The effect of the exhaust gas impinging on the reaction surface causes a delay in the opening of the fins. This is particularly beneficial when the rocket is used as part of a helicopter weapons system in that it permits the rocket to leave the flow field caused by the rotary wing before the fins open and thereby improves the accuracy of the rocket.

Although the invention has been described with reference to a particular embodiment, it will be understood to those skilled in the art that the invention is capable of a variety of alternative embodiments within the spirit and scope of the appended claims.

We claim:

1. A fin stabilizing rotating rocket comprising: a warhead; a rocket motor; a folding fin stabilization system; said fin system further comprising a plurality of fins pivotally mounted on a plate and in a position generally parallel to the longitudinal axis of the rocket when at rest and capable of moving away from said axis when in flight; rocket exhaust nozzles inclined at an angle to said plate whereby exhaust gases will flow across said fins when at rest; and reacting means mounted on each fin inducing the rocket to roll.

2. A rotating rocket folding fin system according to claim 1 wherein: said reacting means is a raised half pyramid-wedge, with the apex substantially parallel to the longitudinal axis of the fin.

3. A folded fin rocket stabilization means comprising: a plate mounted on the base of the rocket; a plurality of folded fins pivotally mounted on said plate; plurality of rocket exhaust nozzles extending through said plate and scarfed at an angle to the plate whereby exhaust gases flow along and across said fins; and a half pyramid-wedge mounted on one side of each fin in a manner that the exhaust gases will pass thereover and cause a roll moment in the rocket.

References Cited
UNITED STATES PATENTS

| | | | | |
|---|---|---|---|---|
| 2,426,239 | 8/1947 | Renner | 244— | 3.23 X |
| 2,700,337 | 1/1955 | Cumming | 244— | 3.23 X |
| 2,984,181 | 5/1961 | Baldwin | | 102—3 |
| 3,113,517 | 12/1963 | Kelly et al. | | 102—3 |
| 3,260,205 | 7/1966 | Dietrich | | 244—3.23 |
| 3,319,566 | 5/1967 | Choate et al. | | 244—3.23 X |

BENJAMIN A. BORCHELT, *Primary Examiner.*

G. R. PENDEGRASS, *Assistant Examiner.*